United States Patent
Schmid et al.

(10) Patent No.: US 7,248,218 B2
(45) Date of Patent: Jul. 24, 2007

(54) RELIABILITY AND THE ACCURACY OF POSITION-FINDING METHODS BY ESTIMATION OF THE RICE FACTOR OF A RADIO LINK

(75) Inventors: Andreas Schmid, Duisburg (DE); André Neubauer, Krefeld (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/146,647

(22) Filed: Jun. 7, 2005

(65) Prior Publication Data

US 2006/0012523 A1 Jan. 19, 2006

(30) Foreign Application Priority Data

Jun. 7, 2004 (DE) .................... 10 2004 027 666

(51) Int. Cl.
    *G01S 3/02* (2006.01)
(52) U.S. Cl. .................................... 342/451
(58) Field of Classification Search ............... 342/450, 342/451, 453, 457; 455/452.2, 456.5, 456.6
    See application file for complete search history.

(56) References Cited

U.S. PATENT DOCUMENTS

| | | | |
|---|---|---|---|
| 5,936,572 A * | 8/1999 | Loomis et al. ......... | 342/357.07 |
| 6,727,849 B1 * | 4/2004 | Kirk et al. ............. | 342/357.14 |
| 2002/0033766 A1 | 3/2002 | Pratt | |
| 2003/0114170 A1 * | 6/2003 | Rick et al. .................. | 455/456 |
| 2003/0220117 A1 * | 11/2003 | Duffett-Smith et al. .. | 455/456.6 |

OTHER PUBLICATIONS

"Moment-Method Estimation of the Ricean K-Factor", L.J. Greenstein, D.G. Michelson and V. Erceg, IEEE Communications Letters, vol. 3, No. 6, Jun. 1999, 3 pgs.

"The Ricean K Factor: Estimation and Performance Analysis", Cihan Tepedelenlioğiu, Ali Abdi and Georgios B. Giannakis, IEEE Transactions on Wireless Communications, vol. 2, No. 4, Jul. 2003, 13 pgs.

* cited by examiner

*Primary Examiner*—Dao L. Phan
(74) *Attorney, Agent, or Firm*—Eschweiler & Associates, LLC

(57) ABSTRACT

In order to improve the reliability and the accuracy of a position-finding method such as the GPS method, the quality of a radio link which is used for the position-finding method is determined by estimating a parameter, in particular the Rice factor of the amplitude distribution density, which is characteristic of the ratio of the strength of a signal transmitted via a line-of-sight path, with respect to the strength of the signals transmitted via non-line-of-sight paths.

10 Claims, 7 Drawing Sheets

Rice factor estimation apparatus

FIG 5D

Variance estimation apparatus

RELIABILITY AND THE ACCURACY OF POSITION-FINDING METHODS BY ESTIMATION OF THE RICE FACTOR OF A RADIO LINK

REFERENCE TO RELATED APPLICATIONS

This application claims the benefit of the priority date of German application DE 10 2004 027 666.8, filed on Jun. 7, 2004, the contents of which are herein incorporated by reference in their entirety.

FIELD OF THE INVENTION

The present invention relates to a method for determining the quality of a radio link, and a method for finding the position of a mobile station by means of a radio link between the mobile station and at least one reference station, in which the reliability and the accuracy of the position-finding are improved by taking into account the result of the determination of the quality of the radio link.

BACKGROUND OF THE INVENTION

It has been known for some time that position-finding can be carried out on the basis of radio links, for example within the satellite-assisted GPS system (Global Positioning System). The European Galileo satellite navigation system, as well as positioning methods based on terrestrial radio sources, offer further applications. Position-finding methods such as these and appropriate appliances allow the user to determine his position by measurement of the distance to a specific number of wire-free signal sources such as satellites or base stations. For example, each GPS and Galileo satellite transmits unique digital sequences, which include a time identification and the satellite position. The signals are normally modulated with long spread sequences. The spread sequences for the individual satellites are virtually orthogonal with respect to one another, so that the signals can be distinguished from one another at the receiver. By way of example, the spread sequences for the various GPS and Galileo satellites are synchronized to one another by means of high-precision atomic clocks that are installed in the satellites.

The receiver evaluates the relative delays (delay time offsets) between different radio sources (GPS satellites, Galileo satellites or terrestrial transmitters). Together with the data about the position and the time reference of the various radio sources, the delay time offsets can be used in order to locate the receiver exactly. The receiver calculates the so-called pseudo-ranges, which represent the distance to each radio source. Navigation software can then calculate the user position on the basis of the pseudo-range to each radio source and the position of the radio sources (GPS satellites, Galileo satellites or terrestrial transmitters) by solving a set of non-linear equations.

The delay time offset between the received signals from the radio sources is frequently measured by determining a correlation maximum in a receiver architecture and assuming that this maximum corresponds to the direct line-of-sight (LOS) path. The problem is that the individual signals do not always reach the receiver along a direct line-of-sight transmission, but often are reflected or scattered by a large number of obstructions such as buildings or hills. These reflected or scattered signals propagate along a greater distance, however, and are therefore delayed. If no line-of-sight path exists, the measured correlation maximum does not correspond to the path delay of a line-of-sight path, and thus leads to a greater pseudo-range. Determination of the user position on the basis of these reflected and delayed signals thus leads to a position error.

Particularly in urban environments and environments within buildings as well as rural environments, it is known that there are reasons why the signals are reflected, diffracted and scattered, thus leading to multipath signal propagation, in which various versions of the signal arrive at different times at the receiver. Depending on the phase offset, the signals are subject to constructive or destructive interference, which leads to multipath fading. This effect can attenuate the line-of-sight signal and can lead to the receiver detecting a delayed version as a supposed maximum, instead of this. Furthermore, obstructions such as buildings in urban environments can shadow the line-of-sight signal to such an extent that the receiver detects a non-line-of-sight signal as the maximum. Multipath fading often leads to line-of-sight signals which are weaker than the non-line-of-sight signals. The severe attenuation, such as that which occurs in environments within buildings, can completely mask the line-of-sight signal with environmental noise, so that the receiver detects a non-line-of-sight signal.

This problem is generally not so important for wire-free communication, since the useful data contained in the received signals can often be recovered from the delayed signals. However, for position-finding systems, the essential information is contained in the time relationship between the signals from the various signal sources. Reflected and delayed signals propagate over a longer distance. The position-finding receiver will in consequence detect a greater pseudo-range than the line of sight range. An incorrect pseudo-range measurement leads to an incorrect position being found. Multipath propagation scenarios normally occur in built-up or mountainous environments, and thus lead to position-finding errors by the position-finding appliances.

Position-finding receivers that are currently in use, in particular GPS receivers with increased sensitivity, determine positions on the basis of all of the detectable satellite signals. A number of position-finding processes are carried out over a predetermined interval. If the so-called "Dilution of Precision" (DOP) for these position-finding processes is below a specific threshold value, the position that has been found is accepted, otherwise the measurements are rejected.

There are also other multipath avoidance techniques which are implemented in the antenna in order to constantly attenuate signals from specific directions. However, this restricts the antenna coverage and requires the antenna to be oriented in a specific manner, thus resulting in problems for hand-held receivers.

A further alternative is to exclude false pseudo-areas by comparison of the calculated user position with a-priori information about the approximate user position. When determining new, unknown positions, this can be done only with considerably reduced accuracy. Furthermore, this means that the position calculation must be carried out before a decision can be made about incorrect pseudo-areas, and thus results in significant additional costs.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof.

Rather, the primary purpose of the summary is to present one or more concepts of the invention in a simplified form as a prelude to the more detailed description that is presented later.

The present invention is directed to a method for determination of the quality of a radio link and a method to improve the reliability of a position-finding method.

One aspect of the present invention is to subject a radio link which can be used for position finding to qualification in terms of the signal strengths of the signals transmitted via the connecting paths from one or a plurality of reference stations. A distinction is in this case drawn between a line-of-sight path and a number of non-line-of-sight paths, and the aim is to estimate the relative strength of the signal transmitted via the line-of-sight path in comparison to the non-line-of-sight paths.

According to the invention, a parameter is thus estimated which is characteristic of the strength of a signal transmitted via a line-of-sight path, with respect to the strength of the signals transmitted via non-line-of-sight paths.

In this case, the expression quality of the radio link should itself be understood in the context of the radio link being used for a position-finding method. As has been explained in the introduction, it is desirable for use such as this for a sufficient signal component of the entire received signal to have been transmitted via the direct line-of-sight path. The quality of the radio link is thus better the greater the relative proportion of the signal transmitted via the line-of-sight path. Since the method according to the invention produces a quantitative variable for this purpose, specifically the estimated value of the characteristic parameter, this therefore creates the precondition for improving the reliability of the position-finding method.

A method according to the invention for finding the position of a mobile station is based on radio links between the mobile station and reference stations. In this case, according to the invention, the quality of the radio links is determined first of all, that is to say a parameter is estimated which is characteristic of the strength of a signal transmitted via a line-of-sight path with respect to the strength of the signals transmitted via non-line-of-sight paths. The value of the characteristic parameter determined in this way is then used as the basis to decide whether the signals received from the reference stations are used for position finding. Alternatively, all of the signals received from the reference stations are provided with a weighting factor based on the characteristic parameter, and are used with different weightings for position finding. This allows the position accuracy to be improved.

The method of the present invention makes it possible to reliably avoid the determination of an incorrect position. If the quality of the radio link as defined according to the invention is too poor, the signals received via the radio link are not included in the position-finding process. This is because they could lead to the correlation maximum that corresponds the line-of-sight path not being detected, and thus to an incorrect delay time being determined, and, as a consequence of this, an incorrect distance to the transmitting reference station being determined.

In particular, the signals received from a reference station are used for position finding only when the value of the characteristic parameter is greater than or less than a predetermined threshold value. Provided that the threshold value is chosen appropriately, this ensures that the signal component received via the line-of-sight path is sufficiently high, and thus that the correct correlation maximum is detected. Alternatively, all of the signals received from the reference station can also be used for position finding, weighted appropriately for the characteristic parameter. The weighting factor based on the characteristic parameter can base the position-finding process to a greater extent on signals whose line-of-sight component is greater. Signals with a smaller line-of-sight component can be taken into account with lower weightings for the position-finding process.

The position-finding method may be a satellite-assisted method, and the reference stations may thus be formed by satellites from the satellites used in the respective system. In particular, the position-finding method can be carried out within the GPS system, the GLONASS system or within the European Galileo system that is currently being set up. However, in principle, it may also be a purely terrestrial position-finding method using terrestrial radio sources.

With regard to the choice of the characteristic parameter, it is advantageously possible to statistically analyse the signals transmitted via the radio link. As is known, the distribution density for the amplitude of received radio signals in multipath propagation environments often, to a sufficient degree of accuracy, has a Rayleigh distribution function or a Rice distribution function. In the case of a Rayleigh distribution, no signal component is transmitted via the line-of-sight path and all of the signal components are transmitted by reflection and scattering processes. In the case of a Rice distribution, a signal component other than zero exists via the line-of-sight path.

In a Rice distribution, the power ratio of the direct signal component to the scattered signal components is referred to as the Rice factor. The Rice factor can thus be used as the characteristic parameter for the method according to the invention. This must then be estimated in some suitable manner in the receiver.

The invention likewise relates to an apparatus for carrying out the method for determination of the quality of a radio link.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

Exemplary embodiments of the invention will be explained in more detail in the following text with reference to the drawing figures, in which.

DETAILED DESCRIPTION OF THE INVENTION

Figure 1A:
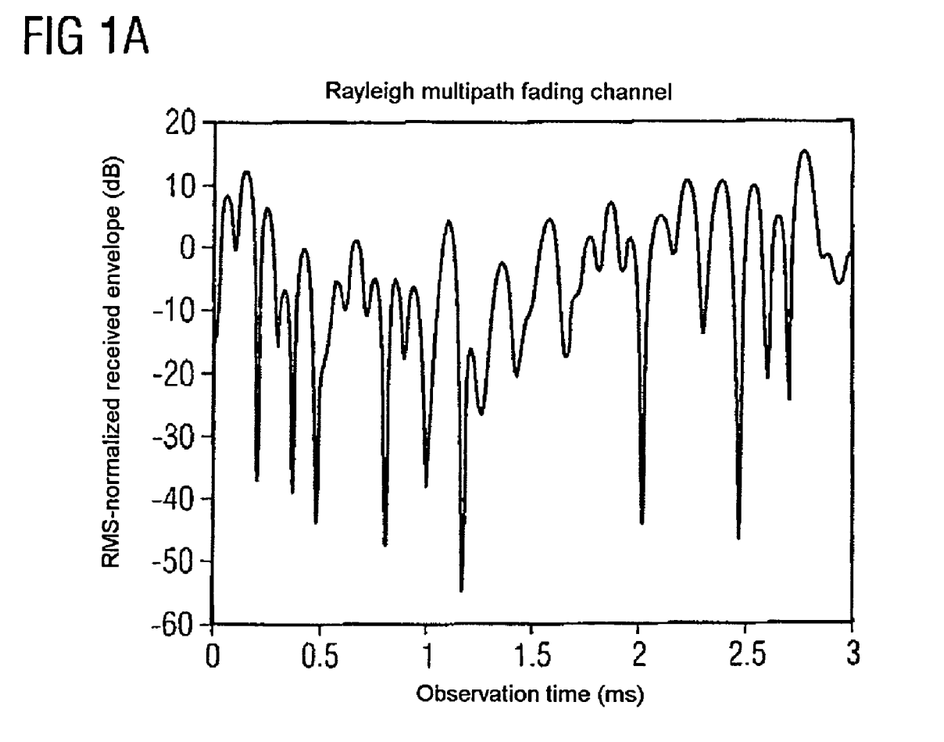
FIG. 1a is a graph illustrating a Rayleigh-distributed signal envelope.
Figure 1B:
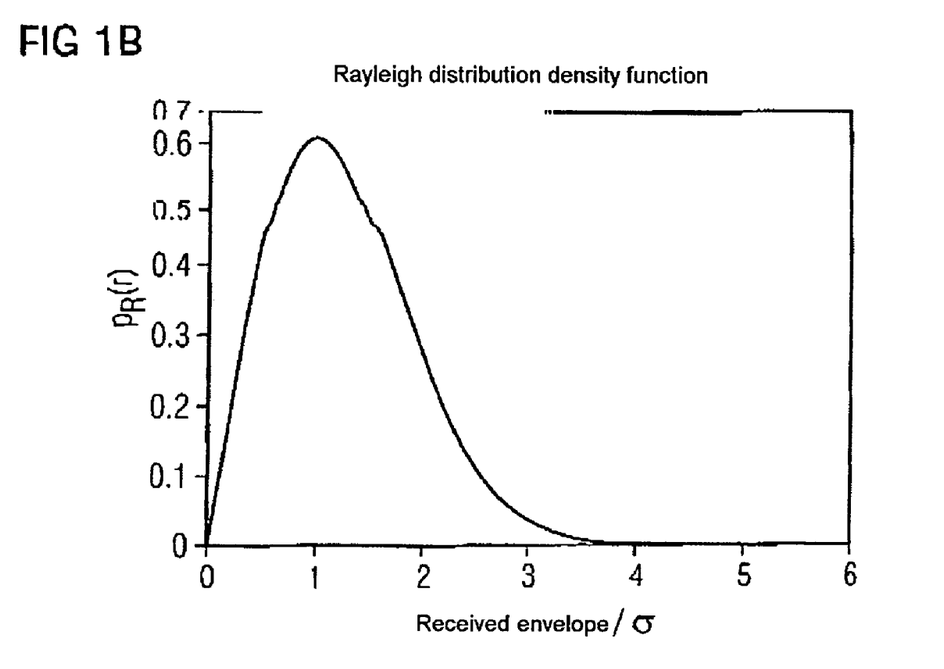
FIG. 1b is a graph illustrating a Rayleigh distribution function.

As is known, the envelope of the sum of the Gaussian-distributed noisy signals which correspond to the two quadrature signals has a Rayleigh distribution. The Rayleigh distribution is therefore used in order to describe the statistical nature of the received envelopes of a multipath signal that is subject to fading. If x and y are independent Gaussian-distributed random variables with a mean value of zero and a common variance $\sigma^2$, then $p_R$ $(r=\sqrt{x^2+y^2})$ has a Rayleigh distribution. FIG. 1a shows a Rayleigh-distributed signal envelope as a function of time, and FIG. 1b shows the Rayleigh distribution function (pfd, probability density function) which is given by:

$$p_R(r) = \begin{cases} \frac{r}{\sigma^2} \cdot \exp\left(-\frac{r^2}{2\sigma^2}\right); & 0 \leq r \leq \infty \\ 0; & r < 0 \end{cases} \quad (1)$$

The non-central moments of the Rayleigh distribution are derived to give:

$$E\{R^n\} = 2^{n/2} \cdot \sigma^n \cdot \Gamma\left(\frac{n}{2}+1\right) \quad (2)$$

where $\Gamma\{\ \}$ is the gamma function. In particular, the second and fourth non-central moments are given by:

$$E\{R^2\} = 2\sigma^2$$

$$E\{R^4\} = 8\sigma^4 \quad (3).$$

Figure 2A:
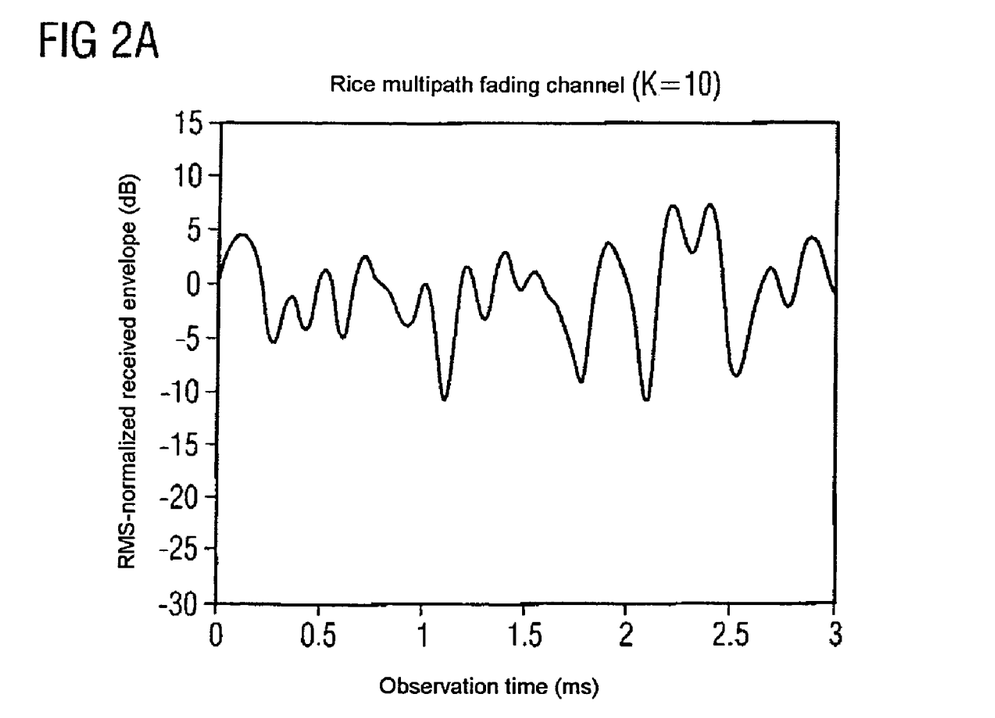
FIG. 2a is a graph illustrating a Rice-distributed signal envelope.
Figure 2B:
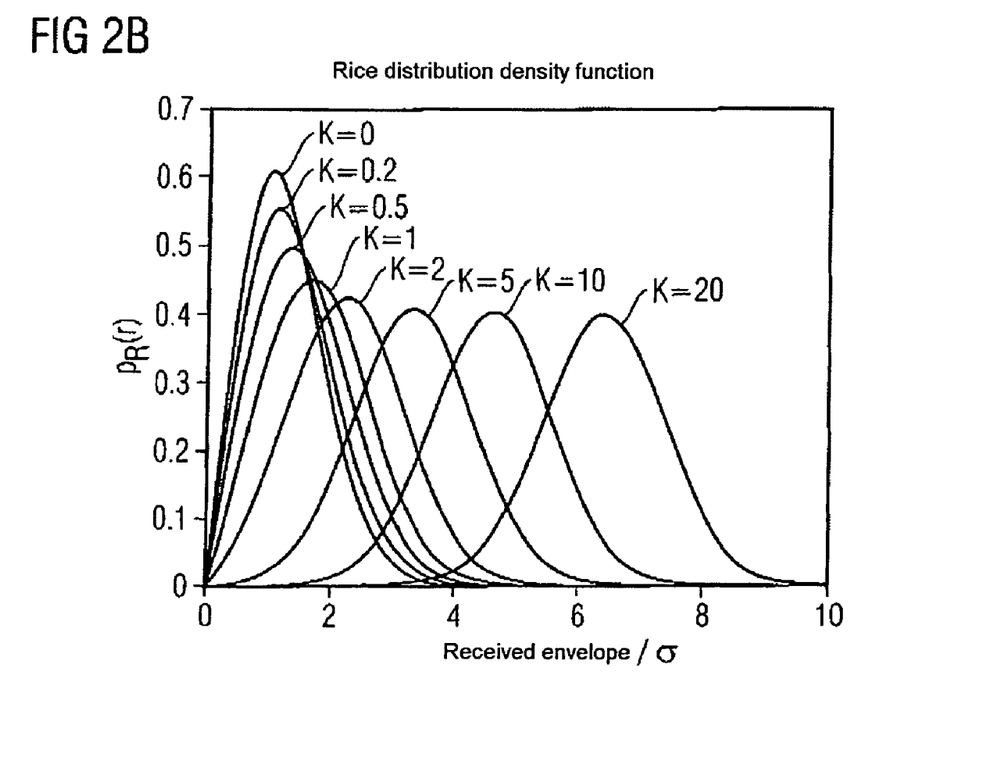
FIG. 2b is a graph illustrating a Rice distribution function.

If a dominant, stationary (that is to say not subject to fading) signal component exists such as the line-of-sight signal, the envelope has a Rice distribution. In a situation such as this, the random multipath components which arrive with different phases are superimposed on a stationary, dominant signal. At the output of an envelope detector, this has the effect of adding a DC component to the random multipath signal. If x and y are independent Gaussian-distributed random variables with a common variance $\sigma^2$ and mean values $\mu_x$ and $\mu_y$ other than zero, then $p_r$ $(r=\sqrt{x^2+y^2})$ forms a Rice distribution. FIG. 2a shows a Rice-distributed signal envelope as a function of time, and FIG. 2b shows a Rice distribution function, which is given by:

$$p_R(r) = \begin{cases} \frac{r}{\sigma^2} \cdot \exp\left(-\frac{r^2+A^2}{2\sigma^2}\right) \cdot I_0\left(\frac{A \cdot r}{\sigma^2}\right); & A \geq 0, r \geq 0 \\ 0; & r < 0 \end{cases} \quad (4)$$

where $I_0(\ )$ is the modified Bessel function of a first type and zero order. The non-central moments of the Rice distribution are derived to give:

$$E\{R^n\} = 2^{n/2} \cdot \sigma^n \cdot \Gamma\left(\frac{n}{2}+1\right) \cdot \exp\left(-\frac{A^2}{2\sigma^2}\right) \cdot {}_1F_1\left(\frac{n}{2}+1; 1; \frac{A^2}{2\sigma^2}\right), \quad (5)$$

where ${}_1F_1(x; y; z)$ is the confluent hypergeometric function. The linear non-central moments of the Rice distribution are simplified to give conventional polynomials, in particular:

$$E\{R_2\} = A^2 + 2\sigma^2$$

$$E\{R^4\} = A^4 + 8\sigma^2 A^2 + 8\sigma^4 \quad (6)$$

As the dominant line-of-sight signal becomes weaker, the collated signal becomes similar to a noise signal which has an envelope with a Rayleigh distribution. The Rice distribution is thus degenerated to form a Rayleigh distribution when the dominant, direct component fades away.

The ratio between the signal strength of the line-of-sight component and the variance of the multipath component is referred to as the Rice factor:

$$K = \frac{A^2}{2\sigma^2} \quad (7)$$

As the dominant line-of-sight component in the amplitude decreases and the Rice distribution degenerates to a Rayleigh distribution, K approximates to the value 0. A large value of K indicates a strong line-of-sight component. FIG. 2b shows Rice distributions whose parameter is the Rice factor K.

In the method according to the invention, the Rice factor K can be estimated for each radio link to a satellite or to a terrestrial station. The Rice factor is a measure of the quality or the reliability of the radio link for the position-finding process to be carried out.

One simple way to determine the Rice factor is based on the second non-central moment $E\{R^2\} = A^2 + 2\sigma^2$. A first simple approximation for the Rice factor is derived to give:

$$\hat{K}_S = \frac{\hat{A}^2}{2\hat{\sigma}^2} \approx \frac{\hat{E}\{R^2\} - 2 \cdot \hat{E}\{(R-\hat{E}\{R\})^2\}}{2 \cdot \hat{E}\{(R-\hat{E}\{R\})^2\}}. \quad (8)$$

This equation (8) may be used for estimation of the Rice factor by substitution of the amplitude of the received signal (for example from successive sample values) for R, and with $\hat{E}\{x\}$ being approximated by a running mean value of x. $\hat{E}\{R^2\}$ is thus implemented, for example, by producing the magnitude square of the amplitude and by subjecting this to a running averaging process. Equation (8) can be implemented in hardware, or can be calculated by software (in the DSP).

A more accurate method for estimation of the Rice factor, and which also produces quicker convergence, is based on the second and fourth non-central moments. Since all of the individual moments of the Rice distribution depend on σ and K, a secondary function is defined, which now depends only on K, specifically in the form:

$$f_{n,m}(K) = \frac{(E\{R^n\})^m}{(E\{R^m\})^n} \qquad (9)$$

$$f_{2,4}(K) = \frac{(E\{R^2\})^4}{(E\{R^4\})^2} = \left[\frac{(K+1)^2}{K^2+4K+2}\right]^2. \qquad (10)$$

If equation (10) is solved for K, this results in a non-negative solution, which provides an estimate of the Rice factor in the form:

$$\hat{K}_{2,4} = \frac{\hat{E}\{R^4\} - 2\cdot(\hat{E}\{R^2\})^2 - \hat{E}\{R^2\}\cdot\sqrt{2\cdot(\hat{E}\{R^2\})^2 - \hat{E}\{R^4\}}}{(\hat{E}\{R^2\})^2 - \hat{E}\{R^4\}}. \qquad (11)$$

This equation (11) can be used for estimation of the Rice factor by substitution of the amplitude of the received signal (for example from successive sample values) for R, and with $\hat{E}\{x\}$ being approximated by a running mean value of x, as already explained above with reference to equation (8). Once again, the implementation may be based on hardware or software in this case.

Figure 3:
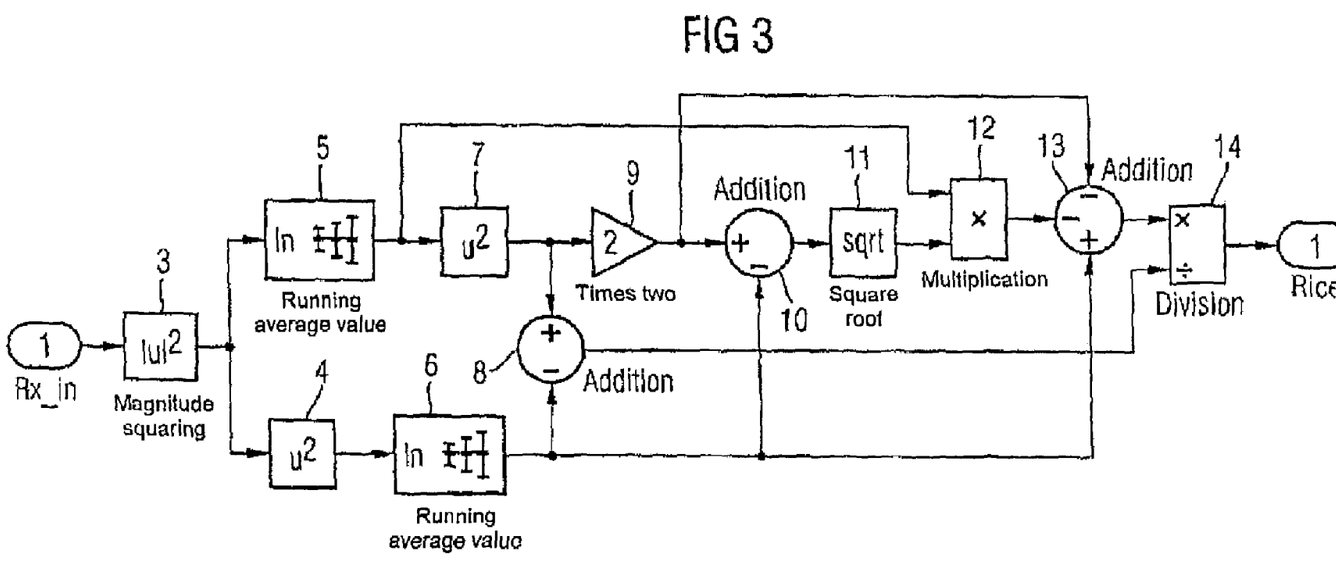
FIG. 3 is a block diagram illustrating a Rice-factor estimation apparatus.

FIG. 3 shows a block diagram of an estimation apparatus for the Rice factor based on the above equation (11).

As can be seen from the block diagram in FIG. 3, the Rice factor (2) is estimated using the equation (11) from received signal values Rx_in (1). The received values are first of all passed to a magnitude squaring device 3, whose output is connected to the input of a squaring device 4 and to the input of a first running averaging device 5. This first running averaging device 5 produces approximate values for the terms $\hat{E}\{R^2\}$ which occur in the equation (11). The output of the squaring device 4 is passed to the input of a second running averaging device 6. This second running averaging device 6 produces approximate values for the terms $\hat{E}\{R^4\}$ which occur in the equation (11). The output of the first averaging device 5 is passed to the input of a squaring device 7 and to the first input of a multiplier 12. The output of the squaring device 7 is passed to the first input of an adder 8, while the output of the second averaging device 6 is passed to the second input of the adder 8 with a negative mathematical sign. The output of the squaring device 7 is also passed to a times-two multiplier 9, whose output is passed to a first input of an adder 10, to whose second input is passed the output of the second averaging device 6 with a negative mathematical sign. The output of the adder 10 is passed to a square-rooting device 11, whose output is passed to the second input of the multiplier 12. The output of the multiplier 12 is passed to a first input of an adder 13 with a negative mathematical sign, and the output of the times-two multiplier 9 is passed with a negative mathematical sign to a second input of the adder 13, with the output of the averaging device 6 being passed to a third input of the adder 13. The output of the adder 13 is passed to the multiplier input of a combined multiplier/divider 14, while the output of the adder 8 is passed to the divider input. The numerator of the right-hand expression in equation (11) is passed to the multiplier input, while the denominator is passed to the divider input. The output of the combined multiplier/divider 14 provides the estimated value of the Rice factor (2).

Figure 4:
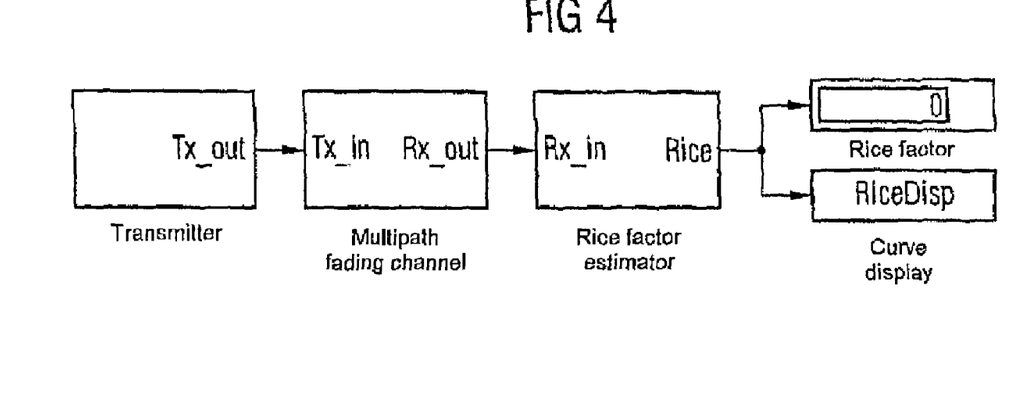
FIG. 4 is a schematic block diagram illustrating a simulation circuit.

FIG. 4 shows a block diagram for carrying out simulations of a radio channel, in which case this simulation circuit can also be implemented in software. The block diagram has a transmitter 20, a multipath fading channel 21 and a Rice factor estimation apparatus 22, which emits the estimated Rice factor to a corresponding unit 23 and to a display unit 24.

Corresponding simulation results are illustrated in FIGS. 5a–d and 6a–d. While the simulation that is illustrated in FIGS. 5a–d represents a Rice-distributed process, that in FIGS. 6a–d relates to a Rayleigh-distributed process.

Figure 5A:
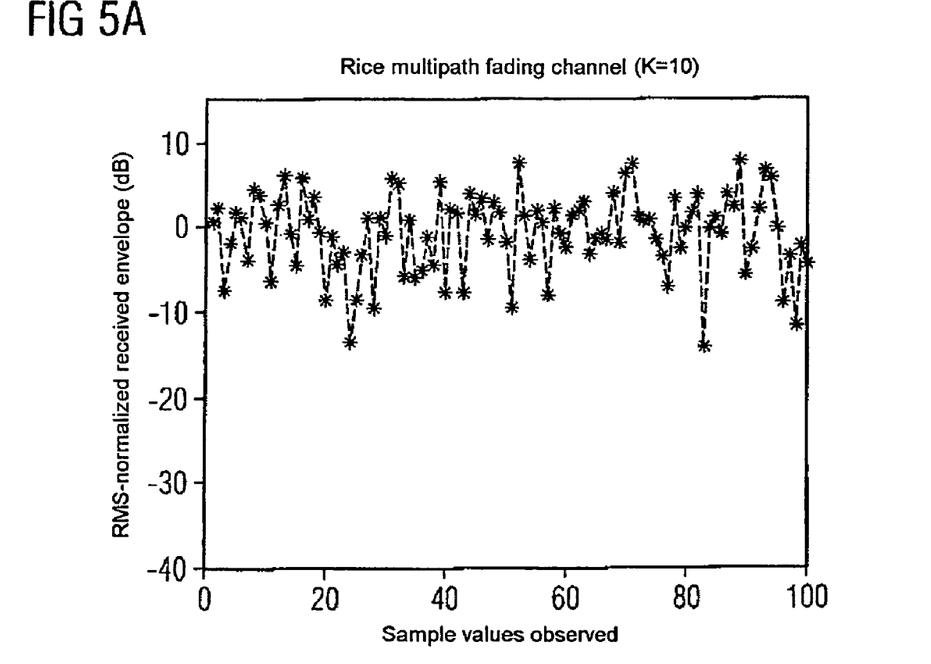
FIG. 5a is a graph illustrating the signal envelope for Rice multipath fading (K=10)
Figure 5B:
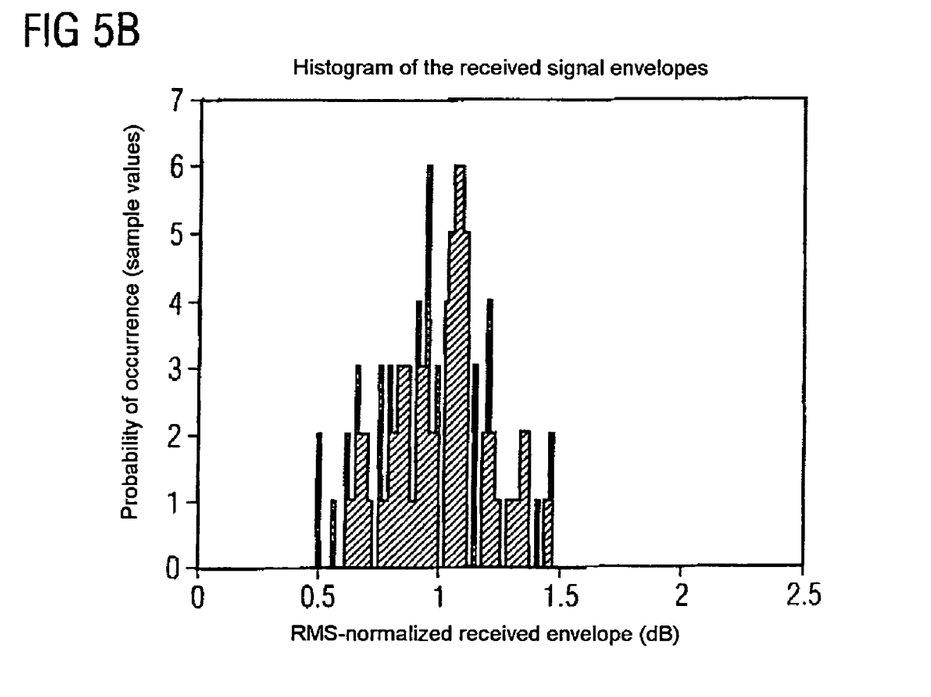
FIG. 5b is a histogram illustrating the received signal envelopes.
Figure 5C:
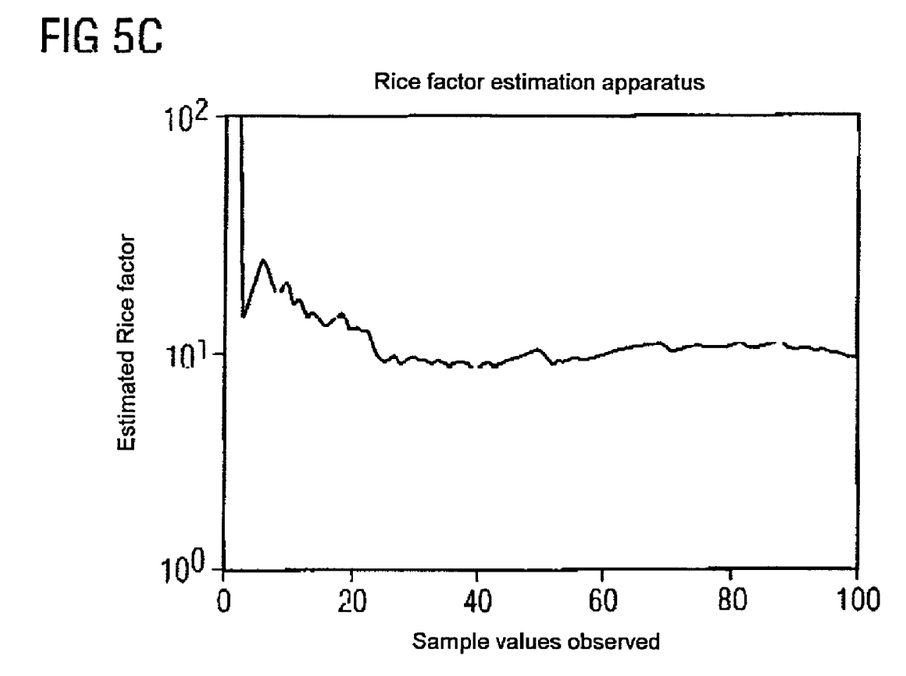
FIG. 5c is a graph illustrating the estimated Rice factor.
Figure 5D:
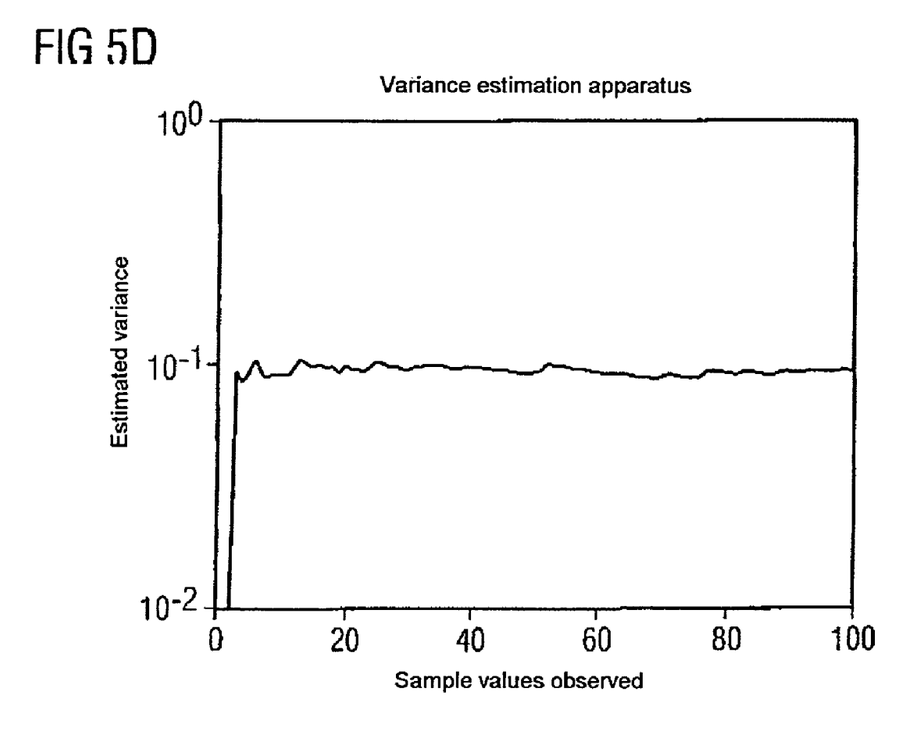
FIG. 5d is a graph illustrating the estimated variance.
Figure 6A:
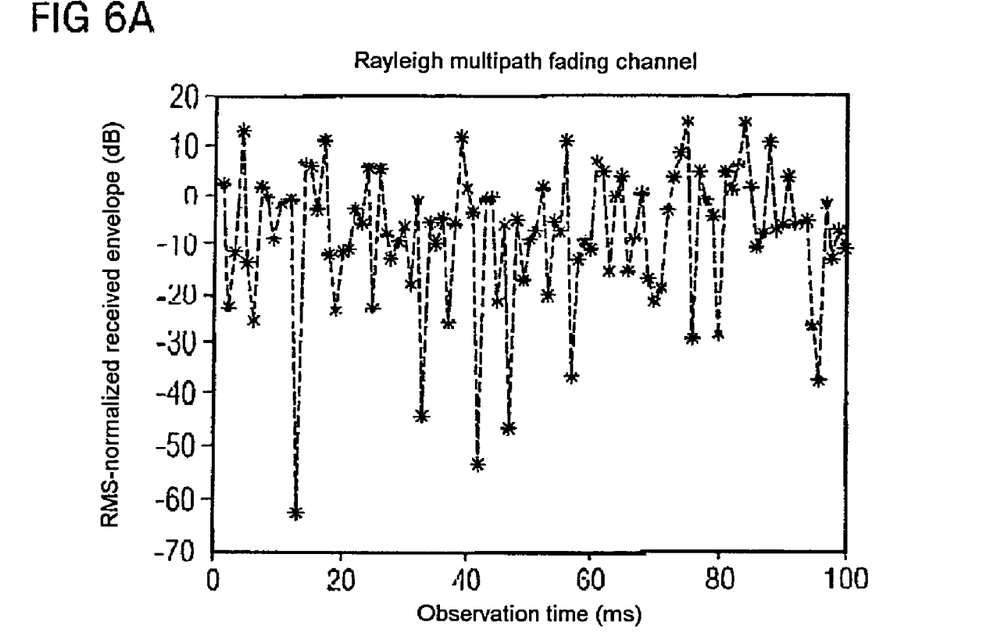
FIG. 6a is a graph illustrating the signal envelope for Rayleigh multipath fading (corresponding to K=0)
Figure 6B:
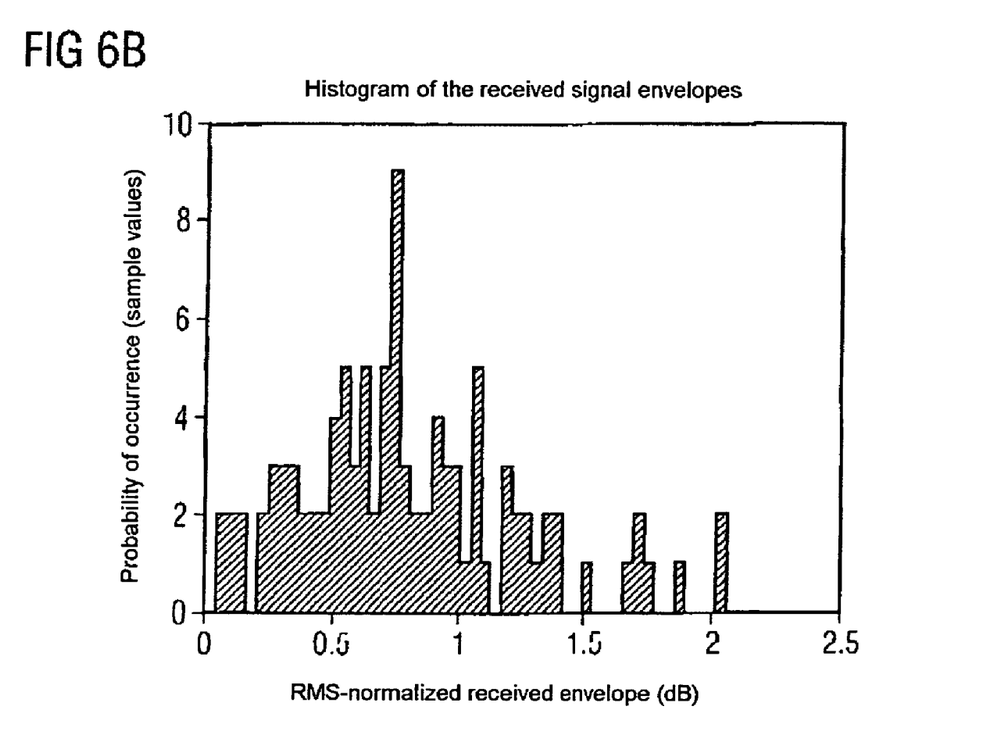
FIG. 6b is a histogram illustrating the received signal envelopes.
Figure 6C:
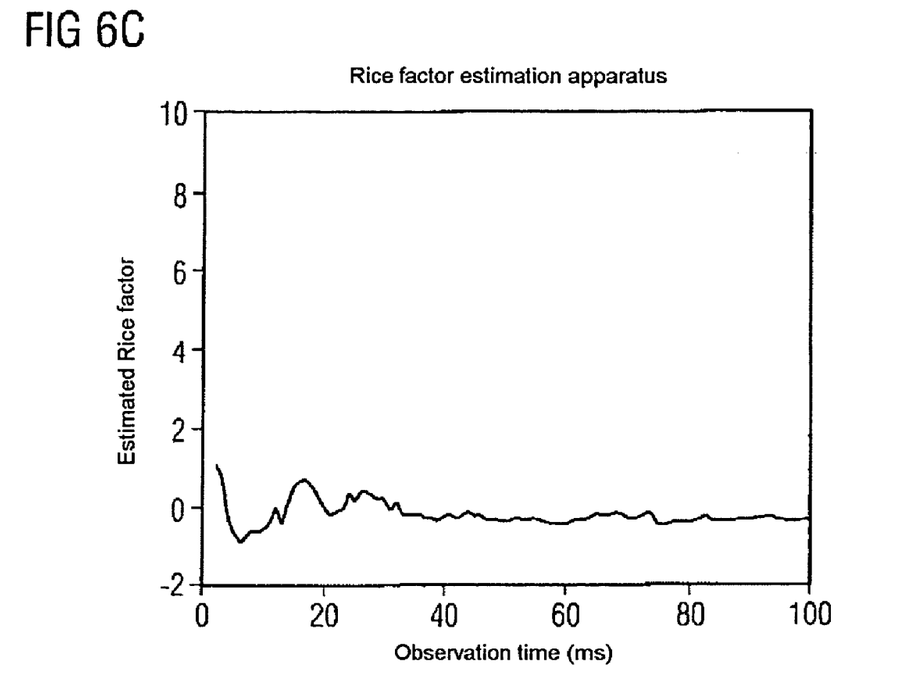
FIG. 6c is a graph illustrating the estimated Rice factor.
Figure 6D:
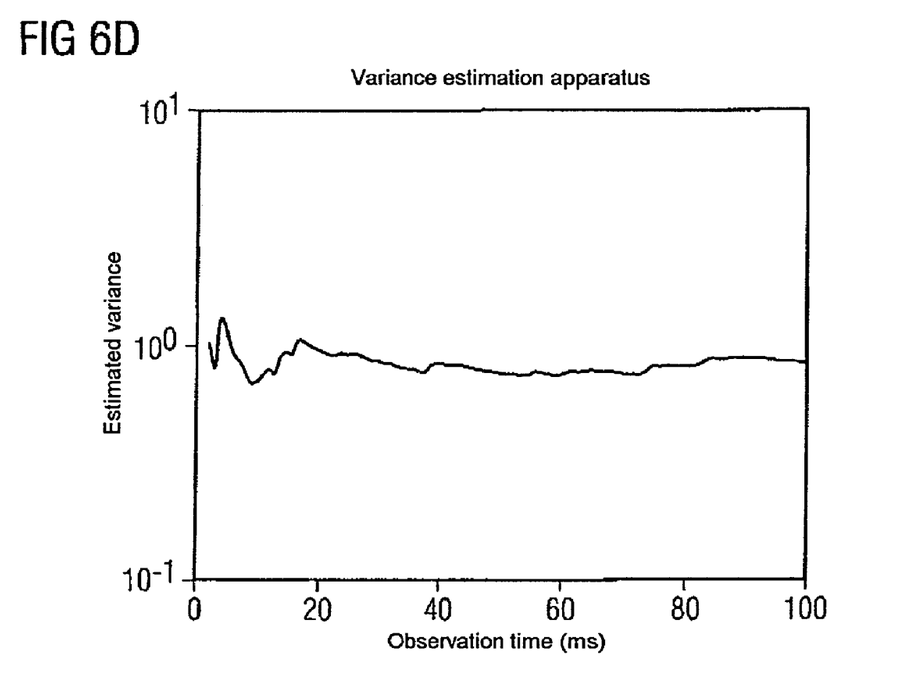
FIG. 6d is a graph illustrating the estimated variance.

As can be seen from FIG. 5c, the Rice factor as estimated using the equation (11) converges to the value K=10 while, as is shown in FIG. 6c, the Rice factor approximates to the value 0.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method for determination of the quality of a radio link, in which the radio signals propagate via two or more propagation paths, comprising:
    estimating a parameter that is characteristic of a signal strength of a received signal that is transmitted via a line-of-sight path, with respect to a strength of received signals transmitted via non-line-of-sight paths; and
    assuming a Rice distribution as the distribution function for the signal strength amplitude, wherein the estimated parameter comprises a Rice factor (K), and wherein the Rice factor is estimated using:

$$\hat{K}_E \approx \frac{\hat{E}\{R^2\} - 2\cdot\hat{E}\{(R - \hat{E}\{R\})^2\}}{2\cdot\hat{E}\{(R - \hat{E}\{R\})^2\}}$$

where R is the amplitude of the sample values of the received signal and $\hat{E}\{x\}$ is approximated by a running averaging of x.

2. A method for determination of the quality of a radio link, in which the radio signals propagate via two or more propagation paths, comprising:

estimating a parameter that is characteristic of a signal strength of a received signal that is transmitted via a line-of-sight path, with respect to a strength of received signals transmitted via non-line-of-sight paths; and
assuming a Rice distribution as the distribution function for the signal strength amplitude, wherein the estimated parameter comprises a Rice factor (K), and wherein the Rice factor is estimated using:

$$\hat{K}_{2,4} = \frac{\hat{E}\{R^4\} - 2 \cdot (\hat{E}\{R^2\})^2 - \hat{E}\{R^2\} \cdot \sqrt{2 \cdot (\hat{E}\{R^2\})^2 - \hat{E}\{R^4\}}}{(\hat{E}\{R^2\})^2 - \hat{E}\{R^4\}}$$

where R is the amplitude of the sample values of the received signal and $\hat{E}\{x\}$ is approximated by a running averaging of x.

3. A method for finding the position of a mobile station by means of a radio link between the mobile station and at least one reference station, comprising:
determining a quality of the radio link, wherein the quality determination comprises estimating a parameter that is characteristic of a signal strength of a received signal that is transmitted via a line-of-sight path, with respect to a strength of received signals transmitted via non-line-of-sight paths; and
using the parameter to decide whether the signal received from the reference station is to be used for position finding; or
using the signals associated with the line-of-sight path and non line-of-sight paths for position finding after assigning weights to each of the signals by means of a weighting factor based on the value of the parameter for each of the signals.

4. The method of claim 3, wherein the signals that are received from the reference station are used for position finding only when the value of the parameter is greater than a first predetermined threshold value.

5. The method of claim 3, wherein the signals that are received from the reference station are used for position finding only when the value of the parameter is less than a second predetermined threshold value.

6. The method of claim 3, wherein the signals that are received from the reference station are weighted differently by using the signals to a greater or lesser extent for position finding, in accordance with their associated parameter.

7. The method of claim 3, wherein the position-finding method comprises a satellite-assisted method, and the reference station comprises a satellite with the position-finding method being carried out in the GPS system, the GLONASS system or in the European Galileo system.

8. The method of claim 3, further comprising:
assuming a Rice distribution as the distribution function for the signal strength amplitude, wherein the estimated parameter comprises a Rice factor (K), and wherein the Rice factor is estimated using:

$$\hat{K}_s \approx \frac{\hat{E}\{R^2\} - 2 \cdot \hat{E}\{(R - \hat{E}\{R\})^2\}}{2 \cdot \hat{E}\{(R - \hat{E}\{R\})^2\}}$$

where R is the amplitude of the sample values of the received signal and $\hat{E}\{x\}$ is approximated by a running averaging of x.

9. The method of claim 3, further comprising: assuming a Rice distribution as the distribution function for the signal strength amplitude, wherein the estimated parameter comprises a Rice factor (K), and wherein the Rice factor is estimated using:

$$\hat{K}_{2,4} = \frac{\hat{E}\{R^4\} - 2 \cdot (\hat{E}\{R^2\})^2 - \hat{E}\{R^2\} \cdot \sqrt{2 \cdot (\hat{E}\{R^2\})^2 - \hat{E}\{R^4\}}}{(\hat{E}\{R^2\})^2 - \hat{E}\{R^4\}}$$

where R is the amplitude of the sample values of the received signal and $\hat{E}\{x\}$ is approximated by a running averaging of x.

10. The method of claim 3, wherein the signals employed to determine the quality of the radio link are received from a plurality of reference stations.

* * * * *